United States Patent
Omori et al.

(10) Patent No.: US 12,120,247 B2
(45) Date of Patent: *Oct. 15, 2024

(54) OWNER IDENTITY CONFIRMATION SYSTEM, CERTIFICATE AUTHORITY SERVER AND OWNER IDENTITY CONFIRMATION METHOD

(71) Applicant: Nippon Telegraph and Telephone Corporation, Tokyo (JP)

(72) Inventors: Yoshihiko Omori, Musashino (JP); Takao Yamashita, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 362 days.

This patent is subject to a terminal disclaimer.

(21) Appl. No.: 17/627,436

(22) PCT Filed: Aug. 1, 2019

(86) PCT No.: PCT/JP2019/030339
§ 371 (c)(1),
(2) Date: Jan. 14, 2022

(87) PCT Pub. No.: WO2021/019781
PCT Pub. Date: Feb. 4, 2021

(65) Prior Publication Data
US 2022/0271948 A1    Aug. 25, 2022

(51) Int. Cl.
*H04L 9/32*    (2006.01)
*H04L 9/00*    (2022.01)

(52) U.S. Cl.
CPC ............ *H04L 9/3263* (2013.01); *H04L 9/008* (2013.01); *H04L 9/3247* (2013.01)

(58) Field of Classification Search
CPC ..... H04L 9/3263; H04L 9/008; H04L 9/3247; H04L 9/0825; H04L 9/0866; H04L 63/0823
See application file for complete search history.

(56) References Cited

U.S. PATENT DOCUMENTS

| | | | |
|---|---|---|---|
| 2010/0246812 A1* | 9/2010 | Rane | H04L 9/321 380/28 |
| 2014/0068736 A1* | 3/2014 | Agerstam | H04W 12/50 726/7 |

(Continued)

OTHER PUBLICATIONS

Ogata et al., "Investigation of how to manage secret keys used for user authentication in web-based services," 2016 IEICE Communication Society Conference, Sep. 20, 2016, B-7-9:99, 3 pages (with English Translation).

*Primary Examiner* — David J Pearson
(74) *Attorney, Agent, or Firm* — Fish & Richardson P.C.

(57) ABSTRACT

The owner sameness confirmation system determines whether or not the owners of two terminals (200A, 200B) are the same. Authentication station servers (100A, 100B) store electronic certificates issued to the terminals and identity confirmation information of the owners of the terminals in association with each other. The authentication station server (100A) transmits information obtained by encrypting the identity confirmation information of the owner of the terminal (200A) through homomorphic encryption and the electronic certificate of the partner terminal (200B) to the authentication station server (100B). The authentication station server 100B transmits response encrypted information including information obtained by encrypting the identity confirmation information of the owner of the terminal (200B) as a response. The authentication station server (100A) decrypts the response encrypted information and determines the sameness of the owners (Continued)

based on whether or not the decryption result matches a predetermined value.

13 Claims, 8 Drawing Sheets

(56) References Cited

U.S. PATENT DOCUMENTS

| | | | |
|---|---|---|---|
| 2016/0156463 A1* | 6/2016 | Suzuki | H04L 9/0819 |
| | | | 713/171 |
| 2017/0149557 A1* | 5/2017 | Bacon | H04L 9/3093 |
| 2019/0182216 A1* | 6/2019 | Gulak | H04L 63/0414 |

* cited by examiner

Fig. 4

| 131 | 132 | 133 | 134 | 130 |
|---|---|---|---|---|
| IDENTIFICATION INFORMATION | TYPE | KEY OWNER | RELATED CERTIFICATE | |
| 38473857 | OWNER | TARO SUZUKI | - | |
| 84736401 | ONE-TIME | 38WI47D3 | 38473857 | |
| ... | ... | ... | ... | |

| 135 | 136 | |
|---|---|---|
| IDENTITY CONFIRMATION INFORMATION | ELECTRONIC CERTIFICATE | |
| TOKYO PREFECTURE ... | ######## | 138 |
| - | ######## | 139 |
| ... | ... | |

OWNER IDENTITY CONFIRMATION SYSTEM, CERTIFICATE AUTHORITY SERVER AND OWNER IDENTITY CONFIRMATION METHOD

CROSS-REFERENCE TO RELATED APPLICATIONS

This application is a National Stage application under 35 U.S.C. § 371 of International Application No. PCT/JP2019/030339, having an International Filing Date of Aug. 1, 2019. The disclosure of the prior application is considered part of the disclosure of this application, and is incorporated in its entirety into this application.

TECHNICAL FIELD

The present invention relates to an owner sameness confirmation system, an authentication station server, and an owner sameness confirmation method.

BACKGROUND ART

Various services such as product purchasing and administrative procedures have started being provided online. During service provision, user authentication including identity confirmation is essential.

User authentication using public key infrastructure is one example of user authentication. With public key infrastructure, an identity confirmation document (e.g., driver's license, etc.) of a user is checked at an authentication station (a certificate issuance server or authentication station server of an authentication station), and thereafter a public key certificate (electronic certificate) is issued to the terminal owned by the user.

The terminal generates a signature (digital signature) for data using a secret key, and transmits the generated signature to a server (the server that authenticates the user and provides the service to the terminal) together with the electronic certificate. The server confirms that the electronic certificate is authentic by confirming (successfully verifying) the signature of the authentication station given to the electronic certificate. Next, the server verifies the signature given to the data using a public key included in the electronic certificate. If verification is successful, the server can confirm that the data was transmitted from the user. Furthermore, the server can obtain information relating to the user from the information included in the electronic certificate.

When the user is in possession of multiple terminals, it is preferable that data can be shared between the terminals. For example, if one service is used from multiple terminals, it is desirable that the public key used for user authentication during service use is shared between the terminals and the user is authenticated as the same user from any terminal. There are also cases in which the user wishes to share the data needed for copyright management in order to view content on multiple terminals. When data is to be shared, it is a prerequisite that the owners of the terminals are the same, and it needs to be confirmed that the owners are the same before sharing is performed.

The technique disclosed in NPL 1 is a technique for confirming that the owners of multiple terminals are the same. In this technique, an electronic certificate (owner electronic certification) is issued to each terminal. Each of two terminals can confirm that the owner is the same by comparing the electronic certificate of the terminal and the electronic certificate of a partner (partner terminal), and it is possible to share data between terminals or between applications of the terminal (e.g., a content viewing application).

An example of a FIDO client and an authenticator in FIDO (Fast IDentity Online), which is an authentication technique used instead of a password, is another example in which it is required that the owners are the same. Since the FIDO client and the authenticator execute user authentication in a linked manner, it is a prerequisite that the owner is the same. For this reason, confirmation of the fact that the owner of the FIDO client and the owner of the authenticator are the same is required before user authentication.

CITATION LIST

Non Patent Literature

[NPL 1] Ogata, Y., others, Study Regarding Maintenance and Management of Secret key for Authentication Scheme Using Non-Symmetrical Key, Proceedings of the 2016 IEICE Society Conference, B-7-9, 2016.

SUMMARY OF THE INVENTION

Technical Problem

The method described in NPL 1, in which the sameness of the owners is confirmed by comparing electronic certificates in multiple terminals with the same owner, has two further problems from the perspective of improving useability and improving security. One problem is that the sameness of the owners cannot be confirmed if electronic certificates have been issued from different authentication stations. If the authentication stations are different, the item (type) of the identity confirmation information or the format will be different, whereby it will not be possible to compare in some cases even though the owners are the same. The other problem is that there is a risk that the identity confirmation information included in the electronic certificate will be stolen and misused. If owner sameness confirmation processing is executed with an unauthorized terminal that has been stolen or the like, there is a risk that information relating to the identity confirmation information included in the electronic certificate will leak out and be misused.

The present invention was made in view of this kind of background and aims to enable owner sameness confirmation between terminals while ensuring security.

Means for Solving the Problem

In order to solve the above-described problem, an owner sameness confirmation system is an owner sameness confirmation system constituted by including a plurality of terminals and a plurality of authentication station servers, in which each terminal includes a confirmation request transmission unit configured to transmit, to an authentication station server that issued an electronic certificate to the terminal, a terminal-issued confirmation request message including an electronic certificate of a partner terminal that is a target of owner sameness confirmation, the authentication station server that issued an electronic certificate to the terminal includes: a storage unit configured to store the electronic certificate issued to the terminal and identity confirmation information of an owner of the terminal in association with each other; and a confirmation request unit configured to, upon receiving the terminal-issued confirmation request message, transmit an authentication station-issued confirmation request message including encrypted information obtained by encrypting the identity confirmation information of the owner of the terminal using a public key for homomorphic encryption, the electronic certificate of the partner terminal, and the public key to an authentication station server that issued the electronic certificate of the partner terminal, the authentication station server that issued the electronic certificate of the partner terminal includes: a storage unit configured to store the electronic certificate issued to the partner terminal and identity confirmation information of an owner of the partner terminal in association with each other; and a confirmation response unit configured to, upon receiving the authentication station-issued confirmation request message, acquire the identity confirmation information of the owner of the partner terminal from the electronic certificate of the partner terminal and transmit response encrypted information, which is the result of calculating an encrypted text obtained by encrypting the identity confirmation information using the public key and the encrypted information through computation corresponding to the homomorphic encryption, as a response to the transmission source of the authentication station-issued confirmation request message, and the authentication station server that issued the electronic certificate to the terminal further includes: a result notification unit configured to decrypt the response encrypted information, determine whether or not the identity confirmation information of the owner of the terminal and the identity confirmation information of the owner of the partner terminal match each other based on whether or not the decryption result matches a predetermined value, and notify the terminal of the determination result.

Effects of the Invention

According to the present invention, it is possible to confirm the sameness of owners between terminals while ensuring security.

BRIEF DESCRIPTION OF DRAWINGS

FIG. 4 is a diagram showing a data structure of electronic certificate data according to the present embodiment.

DESCRIPTION OF EMBODIMENTS

Figure 1:
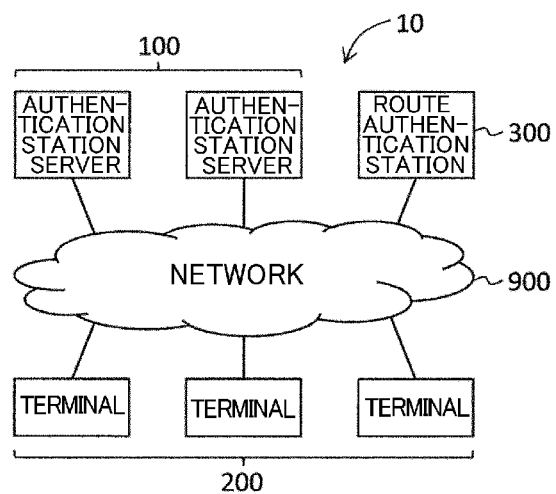
FIG. 1 is a diagram showing an overall configuration of an owner sameness confirmation system according to the present embodiment.

Hereinafter, an owner sameness confirmation system for confirming the sameness of an owner of a terminal according to a mode for carrying out the present invention (embodiment) will be described. The owner sameness confirmation system is constituted by including a terminal and an authentication station server for issuing an electronic certificate (also written simply as "certificate") to the terminal. The authentication station server holds identity confirmation information that was referenced in owner confirmation performed when the electronic certification was issued to the terminal.

There are two types of electronic certification, namely an owner electronic certification and a one-time electronic certification. First, the identity confirmation information of the user of the terminal is confirmed, and the authentication station server issues an owner electronic certificate to the terminal and stores the owner electronic certificate in association with the identity confirmation information.

When the sameness between the owner of the terminal and the owner of another terminal (partner terminal) is to be confirmed, the terminal requests issuance of the one-time electronic certificate to the authentication station server that issued the owner electronic certificate (the authentication station server of the terminal). The issuance request is signed with a secret key corresponding to the owner electronic certificate. The authentication station server issues the one-time electronic certificate to the terminal and stores the one-time electronic certificate in association with the owner electronic certificate, and consequently, in association with the identity confirmation information.

In the owner sameness confirmation system, the authentication station server that received a request signed with a secret key corresponding to the one-time electronic certificate from the terminal determines whether or not the owners of the terminals are the same. In the determination, the authentication station server of the terminal transmits encrypted information obtained by encrypting the identity confirmation information held by the authentication station server through homomorphic encryption. Upon receiving the encrypted information, the authentication station server of the partner terminal encrypts the identity confirmation information of the partner terminal held by the authentication station server through homomorphic encryption and transmits a response encrypted signal obtained by multiplying together the result and the received encrypted information as a response. The authentication station server of the terminal decrypts the received data, and if it matches a predetermined value, the pieces of identity confirmation information held by both authentication station servers are determined to be the same, and the owners of the terminals are determined to be the same. Since the identity confirmation information is compared while encrypted through homomorphic encryption, the identity confirmation information does not leak out between the authentication station servers.

Overall Configuration of Owner Sameness Confirmation System

FIG. 1 is a diagram showing an overall configuration of an owner sameness confirmation system 10 according to the present embodiment. The owner sameness confirmation system 10 is constituted by including multiple authentication station servers 100 and multiple terminals 200. The authentication station servers 100 and the terminals 200 can communicate with each other via a network 900. A server of a route authentication station 300 that issued the electronic certificate to the authentication station server 100 may also be connected to the network 900.

Hardware Configuration of Authentication Station Server

Figure 2:
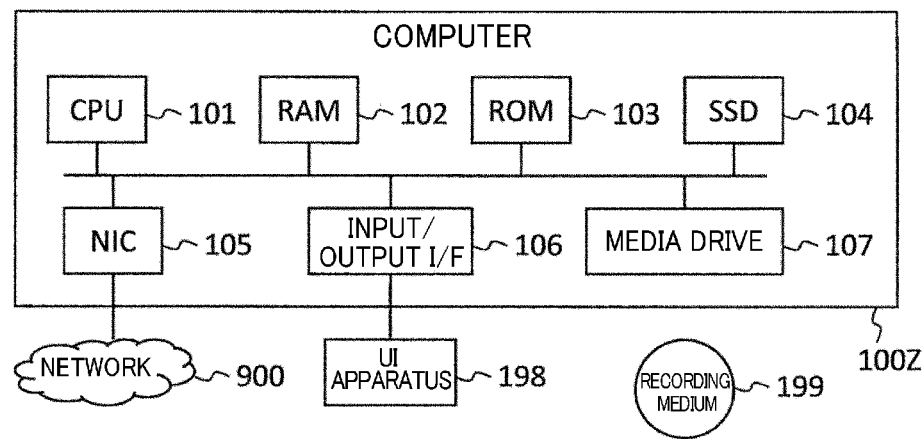
FIG. 2 is a diagram showing a hardware configuration of a computer according to the present embodiment.

FIG. 2 is a diagram showing a hardware configuration of a computer 100Z according to the present embodiment. The computer 100Z is constituted by including a CPU 101, a RAM (Random Access Memory) 102, a ROM (Read Only Memory) 103, an SSD (Solid State Drive) 104, an NIC (Network Interface Card) 105, an input/output interface 106 (written as "input/output I/F (interface)" in FIG. 2), and a media drive 107.

The NIC 105 is connected to the network 900. A display and a user interface apparatus 198 (written as "UI (User Interface) apparatus" in FIG. 2) such as a keyboard and a mouse are connected to the input/output interface 106. The media drive 107 reads a program on a recording medium 199. The recording medium 199 is an optical recording medium such as a DVD (Digital Versatile Disc), a magneto-optical recording medium such as an MO (Magneto Optical disk), a magnetic recording medium, a semiconductor memory, or the like. The computer 100Z functions as the authentication station server 100 that will be described hereinafter, due to the CPU 101 executing the read program (see "authentication station program 121" in FIG. 3, which will be described later).

Functional Configuration of Authentication Station Server

Figure 3:
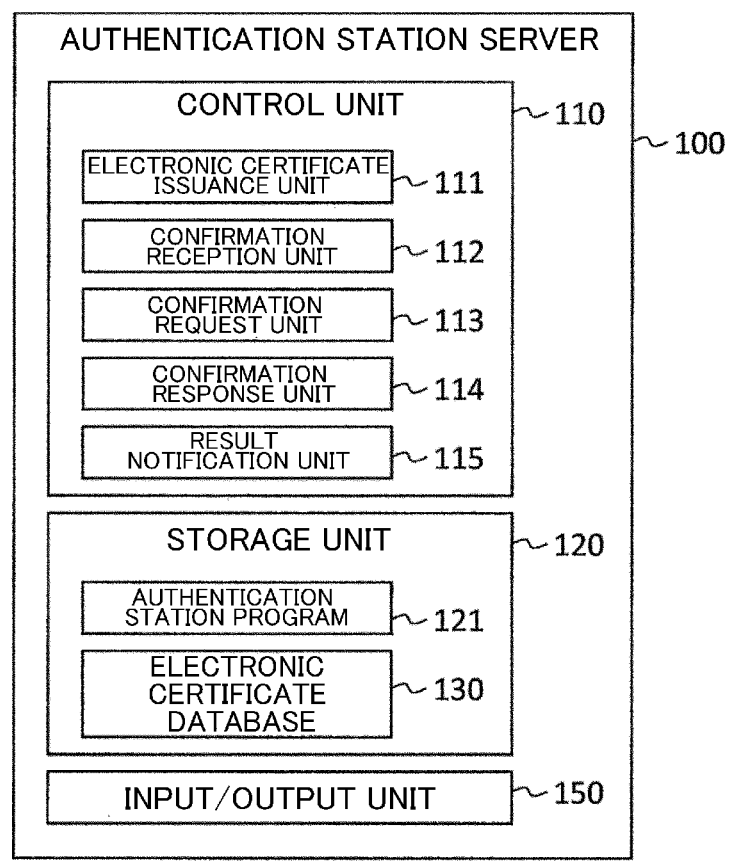
FIG. 3 is a diagram showing a functional configuration of an authentication station server according to the present embodiment.

FIG. 3 is a diagram showing a functional configuration of the authentication station server 100 according to the present embodiment. The authentication station server 100 is constituted by including a control unit 110, a storage unit 120, and an input/output unit 150. The input/output unit 150 is constituted by including an NIC 105, an input/output interface 106, and a media drive 107, and performs transmission and reception of communication data with the terminal 200 (see FIG. 1) and another authentication station server 100 (see FIG. 1). Also, the input/output unit 150 loads the authentication station program 121 from the recording medium 199. The storage unit 120 stores the authentication station program 121, an electronic certificate database 130 (see FIG. 4, which will be described later), and data that is needed in order to function as the authentication station server 100, which includes the secret key and the electronic certificate of the authentication station server 100 issued by the route authentication station 300.

Electronic Certificate Database of Authentication Station Server

FIG. 4 is a diagram showing a data configuration of the electronic certificate database 130 according to the present embodiment. The electronic certificate database 130 is, for example, data in a table format. One row (record) of the electronic certificate database 130 indicates one electronic certificate issued by the authentication station server 100, and is constituted by including identification information 131, a type 132, a key owner 133, a related certificate 134, an identity confirmation information 135, and an electronic certificate 136.

The identification information 131 is identification information of the electronic certificate (e.g., a serial number included in the electronic certificate). The type 132 is the type of the electronic certificate. The type 132 includes "owner", which indicates an owner electronic certificate issued to the terminal 200 after the owner was confirmed, "one-time", which indicates an electronic certificate issued temporarily to a terminal in order to confirm the sameness of the user, and the like. The key owner 133 is the issuance destination of the electronic certificate and indicates the owner (Subject field of the electronic certificate) of the key pair (secret key and public key). The related certificate 134 is the identification information 131 of a related electronic certificate. A related electronic certificate is, for example, an owner electronic certificate of the terminal that is the issuance destination of the one-time electronic certificate in the one-time electronic certificate.

The identity confirmation information 135 is identity confirmation information that was confirmed when the owner electronic certificate was issued. Information indicated in a residence certificate, a driver's license, or the like is an example of the identity confirmation information, and the identity confirmation information 135 includes data (image data, electronic data) of the identity confirmation information, an address, a name, a driver's license number, or information for accessing the identity confirmation information. The electronic certificate 136 is electronic certificate data issued by the authentication station server 100. Note that in addition to the public key (Subject Public Key Info field of the electronic certificate), the electronic certificate includes a key owner 133 (Subject field), identification information (Issuer field) of the authentication station that performed issuance, a validity period (Validity field), a serial number (Serial Number field), and the like.

The record 138 is a record of the owner certificate whose identification information 131 is "38473857", the key owner 133 is the name of the owner, and the address of the owner is included as the identity confirmation information 135. The record 139 is a record of the one-time electronic certificate whose identification information 131 is "84736401", and is related to the electronic certificate indicated in the record 138. Specifically, the electronic certificate of the record 139 is a one-time electronic certificate that was issued to the terminal, which is the issuance destination of the electronic certificate of the record 138. The record 139 of the one-time electronic certificate does not include the identity confirmation information in the identity confirmation information 135, but the authentication station server 100 can acquire the identity confirmation information from the identity confirmation information 135 of the record 138 of the owner electronic certificate indicated in the related certificate 134.

Control Unit of Authentication Station Server

Returning to FIG. 3, the description of the control unit 110 will continue. The control unit 110 is constituted by including an electronic certificate issuance unit 111, a confirmation reception unit 112, a confirmation request unit 113, a confirmation response unit 114, and a result notification unit 115.

The electronic certificate issuance unit 111 issues an electronic certificate in response to a request from the terminal 200 (see FIG. 1). The issued electronic certificate is stored in the electronic certificate database 130.

The confirmation reception unit 112 receives a terminal-issued confirmation request start message (see step S401 in FIG. 9, which will be described later) requesting a random number from the terminal 200, and transmits a random number as a response.

The confirmation request unit 113 receives a terminal-issued confirmation request message (see step S501 in FIG. 10, which will be described later) including information on the partner terminal 200 for confirming the sameness of the owner from the terminal 200. Also, the confirmation request unit 113 transmits an authentication station-issued confirmation request message (see step S507) to the authentication station server 100 (written also as "partner authentication station server") that issued the certificate to the partner terminal 200. The authentication station-issued confirmation request message includes information (encrypted information) obtained by encrypting the information of the partner terminal 200 and the identity confirmation information of the owner stored in the authentication station server 100 using a public key for homomorphic encryption.

The confirmation response unit 114 receives the authentication station-issued confirmation request message as the partner authentication station server 100, and generates response encrypted information obtained by multiplying together the data obtained by encrypting the identity confirmation information of the owner stored as the authentication station server 100 of the partner terminal 200 using a public key for homomorphic encryption and the received encrypted information together. The confirmation response unit 114 transmits an authentication station-issued confirmation response message (see step S510 of FIG. 10, which will be described later) including response encrypted information as a response.

The result notification unit 115 receives the authentication station-issued confirmation response message, determines whether or not the owners of the two terminals 200 are the same, and transmits the determination result as a response to the terminal 200.

Hardware Configuration of Terminal

Figure 5:
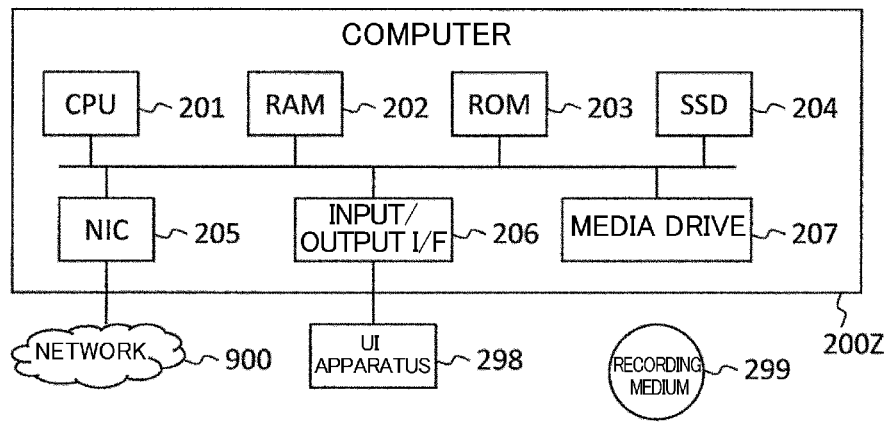
FIG. 5 is a diagram showing a hardware configuration of the computer according to the present embodiment.

FIG. 5 is a diagram showing a hardware configuration of a computer 200Z according to the present embodiment. The computer 200Z has a similar configuration to the computer 100Z (see FIG. 2). The media drive 207 reads a program on a recording medium 299. The computer 200Z functions as the terminal 200 that will be described hereinafter, due to the CPU 201 executing the read program (see "terminal program 221" in FIG. 6, which will be described later).

Functional Configuration of Terminal

Figure 6:
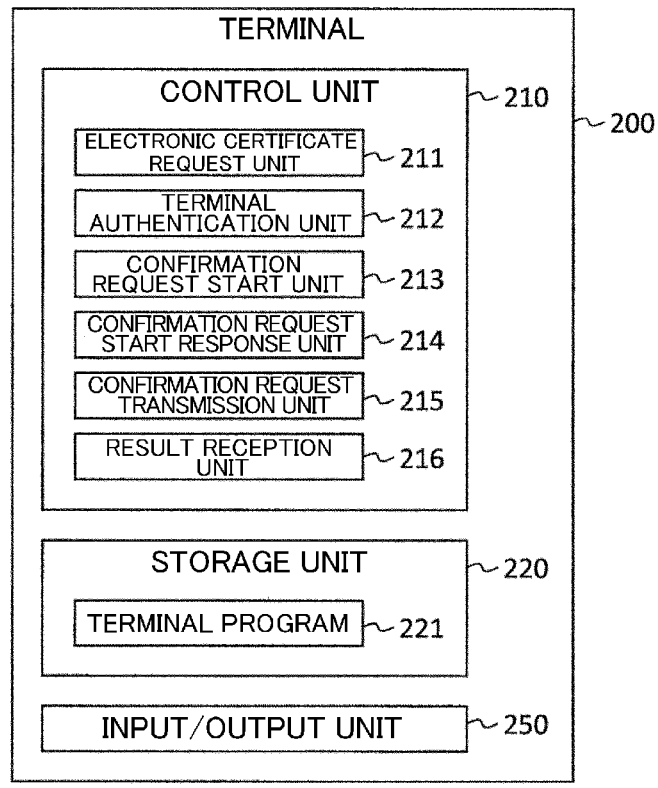
FIG. 6 is a diagram showing a functional configuration of a terminal according to the present embodiment.

FIG. 6 is a diagram showing a functional configuration of the terminal 200 according to the present embodiment. The terminal 200 is constituted by including a control unit 210, a storage unit 220, and an input/output unit 250. The storage unit 220 is constituted by a RAM 202, a ROM 203, an SSD 204, and the like (see FIG. 5), and stores data that is needed for processing for owner sameness confirmation including an encryption key and an electronic certificate described below. In addition to the owner electronic certificate and the one-time electronic certificate, the electronic certificate includes a model number electronic certificate including information on the model number (model) of the terminal 200.

The input/output unit 250 is constituted by including an NIC 205, an input/output interface 206, and a media drive 207 (see FIG. 5), and performs transmission and reception of communication data with another terminal 200 and the authentication station server 100. Also, the input/output unit 250 loads the terminal program 221 from a recording medium 299. Furthermore, the input/output unit 250 receives operations from the user of the terminal and displays information to the user.

The control unit 210 is constituted by including an electronic certificate request unit 211, a terminal authentication unit 212, a confirmation request start unit 213, a confirmation request start response unit 214, a confirmation request transmission unit 215, and a result reception unit 216.

The electronic certificate request unit 211 requests issuance of the electronic certificate to the authentication station server 100.

The terminal authentication unit 212 authenticates the partner terminal 200 for which the sameness of the owner is to be confirmed, and decides on the identity confirmation information for confirming the sameness for the owners of the terminal 200 and the partner terminal 200 in order to confirm owner sameness.

The identity confirmation information for confirming the sameness is an item (type) of the identity confirmation information for confirming that the owners are the same, such as the address, name, or driver's license number. For example, the terminal authentication unit 212 uses an item of the identity confirmation information stored in common by both the authentication station server 100 of the terminal 200 and the authentication station server 100 of the partner terminal 200 as the item for confirming the sameness.

The confirmation request start unit 213 starts processing for owner sameness confirmation by transmitting the later-described terminal-issued confirmation request start message (see step S401 of FIG. 9, which will be described hereinafter) to the authentication station server 100, and transmitting the random number received from the authentication station server 100 to the partner terminal 200.

The confirmation request start response unit 214 receives a random number from the partner terminal 200 and transmits a one-time certificate acquired by the terminal 200 (see step S406 of FIG. 9, which will be described later) as a response.

The confirmation request transmission unit 215 includes the one-time electronic certificate of the partner terminal 200 and transmits the later-described terminal-issued confirmation request message (see step S501 of FIG. 10, which will be described later) to the authentication station server 100.

The result reception unit 216 receives the sameness confirmation result from the authentication station server 100.

Symbols

The symbols to be used in the description will be described before starting the description of the owner sameness confirmation processing.

$I_d^{(O)}$ is the owner electronic certificate of a terminal d. The owner electronic certificate is issued by the authentication station server 100 to the terminal 200. The issued owner electronic certificate is stored in the electronic certificate database 130.

$I_d^{(P)}$ is the one-time electronic certificate of the terminal d. The one-time electronic certificate is issued by the authentication station server 100 that issued the owner electronic certificate to the terminal 200. The issued one-time electronic certificate is stored in the electronic certificate database 130. The one-time electronic certificate need only be valid during the sameness confirmation processing, and the validity period thereof is shorter than the validity period of the owner electronic certificate.

$I_d^{(M)}$ is the model number electronic certificate of the terminal d. The model number electronic certificate is issued by the authentication station server 100 to the terminal 200. The issued model number electronic certificate is stored in the electronic certificate database 130. The authentication station server 100 that issues the model number electronic certificate is not limited to being the same as the authentication station server 100 that issues the owner electronic certificate. There may also be an authentication station server 100 that issues only the model number electronic certificate and does not issue other types of electronic certificate.

$I_d^{(C)}$ is the electronic certificate of the authentication station server d. The electronic certificate of the authentication station server 100 is issued by the route authentication station 300 (server of the route authentication station, see FIG. 1).

$N_{d1,d2}$ is a random number (nonce) generated from the authentication station d2 to the terminal d1.

V+W is data obtained by combining data V and data W.

$M_s(M, K)$ is signed data obtained by signing the data M with the secret key K.

$M_s(M, K1, K2)$ is double-signed data obtained by signing data M with a secret key K1 and further signing the signed data with a secret key K2.

$Q_d$ is an issuance request application for the one-time electronic certificate transmitted from the terminal d to the authentication station server 100. $Q_d$ includes a public key that is generated by the terminal d and is included in the one-time electronic certificate.

$S_d^{(O)}$ is a secret key corresponding to the owner electronic certificate $I_d^{(O)}$ of the terminal d.

$S_d^{(P)}$ is the secret key corresponding to the one-time electronic certificate $I_d^{(P)}$ of the terminal d.

$S_d^{(M)}$ is the secret key corresponding to the model number electronic certificate $I_d^{(M)}$ of the terminal d.

$S_d^{(C)}$ is the secret key corresponding to the electronic certificate $I_d^{(C)}$ of the authentication station d.

$E_{PK}$ is an encryption formula for homomorphic encryption using a public key PK.

$D_{SK}$ is a decryption formula for homomorphic encryption using a secret key SK. The pair of the public key PK and the secret key SK is generated by the authentication station server 100.

$C_{d1}$ is the result (written also as "encrypted information") of performing encryption using the encryption formula $E_{PK}$ for homomorphic encryption on the identity confirmation information calculated by the authentication station d1. The details of the calculation method for the encryption information $C_{d1}$ will be described later.

$C_{d2}'$ is calculated by the authentication station d2 that received the encryption information $C_{d1}$. $C_{d2}'$ is the result (written also as "response encrypted information") of calculating the encrypted information $C_{d1}$ and the result of performing encryption using the encryption formula $E_{PK}$ for homomorphic encryption on the identity confirmation information through computation corresponding to homomorphic encryption. Details of the method for calculating the response encrypted information $C_{d2}'$ will be described later.

$L_{d1,d2}$ is a list of items of the identity confirmation information for performing owner sameness confirmation between the terminal d1 and the terminal d2.

Homomorphic Encryption

The homomorphic encryption $E_{PK}$ is encryption according to which $E_{PK}(M1+M2)$ can be calculated based on an encrypted text $E_{PK}(M1)$ for unencrypted text M1 and an encrypted text $E_{PK}(M2)$ for unencrypted text M2. Here, + is not limited to addition, and is some kind of binomial computation. For example, with RSA encryption, $E_{PK}(M1) \times E_{PK}(M2) = E_{PK}(M1 \times M2)$ is satisfied. That is, the decrypted product of the encrypted texts is the product of the unencrypted texts. ElGamal encryption is another example.

Also, in Paillier encryption, $E_{PK}(M1) \times E_{PK}(M2) = E_{PK}(M1+M2)$ is satisfied. That is, the decrypted product of the encrypted texts is the sum of the unencrypted texts. Elliptic curve cryptography is another example.

Hereinafter, a method for calculating the encrypted information $C_{d1}$ and the response encrypted information $C_{d2}'$ using Paillier encryption will be described. The secret keys for Paillier encryption are a prime number p and a prime number q with the same length. The public key is $N = p \times q$.

The encryption function is written as $E_N$, and the decryption function is written as $D_{p,q}$.

The encrypted text for the unencrypted text M generates a random number r and satisfies $E_N(M) = (1+N)^M \times r^N \mod N^2$. Hereinafter, description of $\mod N^2$ will be omitted.

$E_N(M1) = (1+N)^{M1} \times r^N$, and $E_N(M2) = (1+N)^{M2} \times s^N$ are satisfied. Here, the random number r and the random number s are random numbers that are generated when an unencrypted text M1 and an unencrypted text M2 are respectively encrypted. Upon doing so, $$E_N(M1) \times E_N(M2) =$$
$$(1+N)^{M1} \times r^N \times (1+N)^{M2} \times s^N = (1+N)^{M1+M2} \times (r \times s)^N = E_N M1 + M2$$

is satisfied, and therefore Paillier encryption is homomorphic encryption.

Next, a method for calculating the encrypted information $C_{d1}$ and the response encrypted information $C_{d2}'$ will be described. Hereinafter, the authentication station server 100A will be described as generating the encrypted information $C_{d1}$ and the authentication station server 100B will be described as generating the response encrypted information $C_{d2}'$ (see FIG. 10, which will be described later).

The identity confirmation information stored in the authentication station server 100A of the terminal 200A for which the sameness is to be confirmed is VA, and the identity confirmation information stored in the authentication station server 100B of the partner terminal 200B is VB. Note that the pieces of identity confirmation information VA and VB are pieces of identity confirmation information that correspond to items included in the item list $L_{d1,d2}$ of the identity confirmation information.

Also, it is assumed that the authentication station server 100A calculates the encrypted information $C_{CA\_A}$ and the authentication station server 100B that received the encrypted information $C_{CA\_A}$ and the public key N of the authentication station server 100A calculates the response encrypted information $C_{CA\_B}'$. The authentication station server 100A generates a random number r, calculates encrypted information $C_{CA\_A} = E_N(VA) = (1+N)^{VQ} \times r^N$, and transmits the result to the authentication station server 100B together with the public key N.

The authentication station server 100B generates a random number s and a random number t, and calculates an encrypted text $E_N(VB)$ by encrypting the identity confirmation information VB stored in the authentication station server 100B. Next, the authentication station server 100B calculates the response encrypted information $C_{CA\_B}'$ as shown below based on the encrypted information $C_{CA\_A}$ ($= E_N(VA)$) and the encrypted text $E_N(VB)$, and transmits the result to the authentication station server 100A.

$$C_{CA\_B}' = (C_{CA\_A})^s \times E_N(VB)^{-s} = (C_{CA\_A})^s \times \left((1+N)^{VB} \times t^N\right)^{-s}$$
$$C_{CA\_B}' = \left((1+N)^{VA} \times r^N\right)^s \times (1+N)^{-sVB} \times t^{-sN} =$$
$$(1+N)^{sVA} \times r^{sN} \times (1+N)^{-sVB} \times t^{-sN} =$$
$$(1+N)^{sVA} \times (1+N)^{-sVB} \times r^{sN} \times t^{-sN} = (1+N)^{s(VA-VB)} \times (r^s \times t^{-s})^N$$

is satisfied, and therefore the result of the authentication station server 100A encrypting the response encrypted information $C_{CA\_B}'$ is $D_{p,q}(C_{CA\_B}')=s$ (VA−VB). Accordingly, if the encryption result is 0, it is understood that the pieces of identity confirmation information VA and VB held by the authentication station servers 100A and 100B are the same.

If the encryption result is not 0, the authentication station server 100A understands that the identity confirmation information does not match. Since the random number s is a random number generated by the authentication station server 100B and $D_{p,q}(C_{CA\_B}')=s(VA-VB)$ is a random number, the authentication station server 100A cannot obtain the information of the identity confirmation information VB and the identity confirmation information VB does not leak out. Conversely, regarding the identity confirmation information VA of the authentication station server 100A, the authentication station server 100B acquires only the encrypted information $C_{CA\_A}$ that was encrypted, and therefore the information cannot be obtained and the identity confirmation information VA does not leak out. That is, if the identity confirmation information does not match, neither of the authentication station servers 100A and 100B leaks the identity confirmation information to its partner.

Although the foregoing is an example of sameness confirmation for identity confirmation information using Paillier encryption, it can be similarly carried out also through homomorphic encryption in which the product of the encrypted texts is the encryption of the sum of the unencrypted texts. $E_{PK}$ is homomorphic encryption in which $E_{PK}(M1) \times E_{PK}(M2) = E_{PK}(M1+M2)$ is satisfied.

The authentication station server 100A calculates the encrypted information $C_{CA\_A}=E_{PK}(VA)$ by encrypting the identity confirmation information VA, and transmits the result to the authentication station server 100B.

The authentication station server 100B generates the random number s, calculates the response encrypted information $C_{CA\_B}'$ as described below, and transmits the result to the authentication station server 100A.

$$C_{CA\_B'} = (C_{CA\_A})^s \times E_{PK}(VB)^{-s}$$

$$C_{CA\_B'} = E_{PK}(VA)^s \times E_{PK}(VB)^{-s} =$$

$$E_{PK}(sVA) \times E_{PK}(-sVB) = E_{PK}(sVA - sVB) = E_{PK}(s(VA - VB))$$

is satisfied, and therefore upon decrypting the response encrypted information $C_{CA\_B}'$r, the authentication station server 100A can obtain $D_{SK}(C_{CA\_B}')=s(VA-VB)$ and can determine the sameness between the identity confirmation information VA and the identity confirmation information VB based on whether or not the result is 0.

This is also similarly possible with homomorphic encryption in which the product of the encrypted texts is the encryption of the product of the unencrypted texts. $E_{PK}$ is homomorphic encryption in which $E_{PK}(M1) \times E_{PK}(M2) = E_{PK}(M1 \times M2)$ is satisfied.

The authentication station server 100A calculates the encrypted information $C_{CA\_A}=E_{PK}(VA)$ by encrypting the identity confirmation information VA, and transmits the result to the authentication station server 100B.

The authentication station server 100B generates the random number s, calculates the response encrypted information $C_{CA\_B}'$ as described below, and transmits the result to the authentication station server 100A.

$$C_{CA\_B'} = (C_{CA\_A})^s \times E_{PK}(VB)^{-s}$$

$$C_{CA\_B'} = E_{PK}(VA)^s \times E_{PK}(VB)^{-s} =$$

$$E_{PK}(VA^s) \times E_{PK}(VB^{-s}) = E_{PK}(VA^s \times VB^{-s}) = E_{PK}((VA/VB)^s)$$

is satisfied, and therefore upon decrypting the response encrypted information $C_{CA\_B}'$, the authentication station server 100A can obtain $D_{SK}(C_{CA\_B}')=(VA/VB)^s$ and can determine the sameness between the identity confirmation information VA and the identity confirmation information VB based on whether or not the result is 1.

As described above, the authentication station server 100A encrypts the identity confirmation information VA stored in the authentication station server 100A using homomorphic encryption, and transmits the result as the encrypted information $C_{CA\_A}(=E_{PK}(VA))$ to the authentication station server 100B. The authentication station server 100B calculates the response encrypted information $C_{CA\_B}'$ by multiplying together the result ($E_{PK}(VB)$) of encrypting the identity confirmation information VB stored in the authentication station server 100B and the received encrypted information $C_{CA\_A}$, and transmits the result as a response to the authentication station server 100A. If the result of decrypting the response encrypted information $C_{CA\_B}'$ is a predetermined value (0 or 1 in the above-described example), the authentication station server 100A determines that the identity confirmation information stored in both of the authentication station servers 100A and 100B is the same.

In the following description, when a signature generated using a secret key S is verified, a public key is acquired from the electronic certificate corresponding to the secret key S, and the signature is verified using the public key. If verification of the signature fails, processing for issuing an owner electronic certificate, processing for issuing a one-time electronic certificate, and processing for confirming the sameness of the owners are canceled.

Note that a signature of the authentication station server 100 is given to the electronic certificate, and the signature of the electronic certificate is verified using the public key of the authentication station server 100. The public key of the authentication station server 100 is acquired after the signature of the electronic certificate of the authentication station server 100 issued by the route authentication station 300 (see FIG. 1) is verified using the public key of the route authentication station 300. Note that the public key of the route authentication station 300 is stored in the storage units 120 and 220 (see FIGS. 3 and 6). Also, a validity period is included in the electronic certificate. If no verification time is included in the validity period, the verification of the electronic certificate fails.

The electronic certificate includes identification information of the authentication station (authentication station server 100) that issued the electronic certificate as the issuer (Issuer field), and the authentication station of the electronic certificate from which the public key is to be acquired is understood.

Hereinafter, processing for issuing the owner electronic certificate and the one-time electronic certificate and processing for confirming the sameness of the owners will be described with reference to FIGS. 7 to 10. In this description, description will be given premised on the fact that the authentication station server 100A issues an electronic certificate to the terminal 200A and the authentication station server 100B issues an electronic certificate to the terminal 200B.

Processing for Issuing Owner Electronic Certificate

Figure 7:
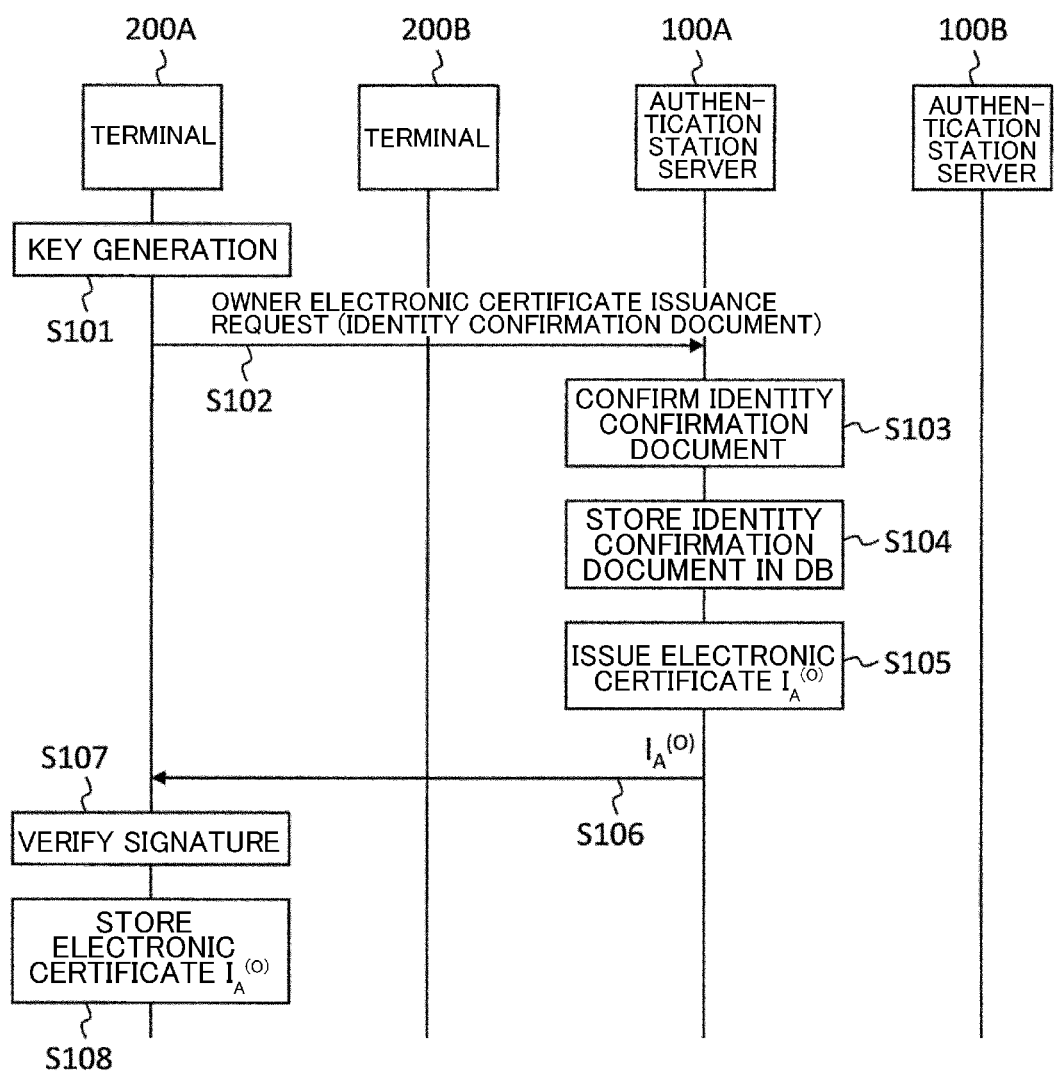
FIG. 7 is a sequence diagram of processing for issuing an owner electronic certificate according to the present embodiment.

FIG. 7 is a sequence diagram showing processing for issuing an owner electronic certificate according to the present embodiment. Processing in which the authentication station server 100A issues the owner electronic certificate to the terminal 200A will be described with reference to FIG. 7. Note that FIG. 7 and FIG. 8, which will be described later, show only messages exchanged between the authentication station server 100A and the terminal 200A. The processing in which the authentication station server 100B issues the owner electronic certificate to the terminal 200B is similar to the processing in which the authentication station server 100A issues the owner electronic certificate to the terminal 200A.

In step S101, the electronic certificate request unit 211 of the terminal 200A generates a key pair (a secret key and a public key) for public key encryption.

In step S102, the electronic certificate request unit 211 transmits the public key generated in step S101 and information on the identity confirmation document to the authentication station server 100A, and requests issuance of the owner electronic certificate. This transmitted message may also be signed with the secret key generated in step S101.

In step S103, the electronic certificate issuance unit 111 of the authentication station server 100A confirms that the identity confirmation document received in step S102 is authentic. Next, the electronic certificate issuance unit 111 confirms that the owner of the terminal 200A and the person described in the identity confirmation document match each other.

In step S104, the electronic certificate issuance unit 111 adds a record to the electronic certificate database 130 (see FIG. 4), and stores the information of the identity confirmation document and the identity information (address, name, etc.; also written as "identity confirmation information") described in the identity confirmation document in the identity confirmation information 135.

In step S105, the electronic certificate issuance unit 111 issues an owner electronic certificate $I_A^{(O)}$ including the public key received in step S102. The key owner (Subject field) of the owner electronic certificate is the entirety or part of the identity confirmation information of the owner, such as the name or address, which was confirmed in step S103. The electronic certificate issuance unit 111 stores the serial number of the issued owner electronic certificate in the identification information 131 of the record added in step S104. Furthermore, the electronic certificate issuance unit 111 stores "owner" in the type 132, the key owner in the key owner 133, "-" in the related certificate 134, and the data of the issued owner electronic certificate in the electronic certificate 136.

In step S106, the electronic certificate issuance unit 111 transmits the issued owner electronic certificate $I_A^{(O)}$ as a response to the request made in step S102 to the terminal 200A.

In step S107, the electronic certificate request unit 211 of the terminal 200A verifies the signature of the authentication station server 100A of the received owner electronic certificate $I_A^{(O)}$.

In step S108, the electronic certificate request unit 211 of the terminal 200A stores the received owner electronic certificate $I_A^{(O)}$ in the storage unit 220.

The foregoing described processing in which the authentication station server 100A issues an owner electronic certificate to the terminal 200A. Similarly, the authentication station server 100B issues the owner electronic certificate to the terminal 200B. The processing in which the authentication station server 100B issues the owner electronic certificate to the terminal 200B is similar to that of FIG. 7, and therefore description thereof is omitted. In this state, the terminals 200A and 200B store the owner electronic certificate and the secret key corresponding thereto. Also, the authentication station servers 100A and 100B store the identity confirmation information in association with the owner electronic certificate.

Processing for Issuing One-Time Electronic Certificate

Figure 8:
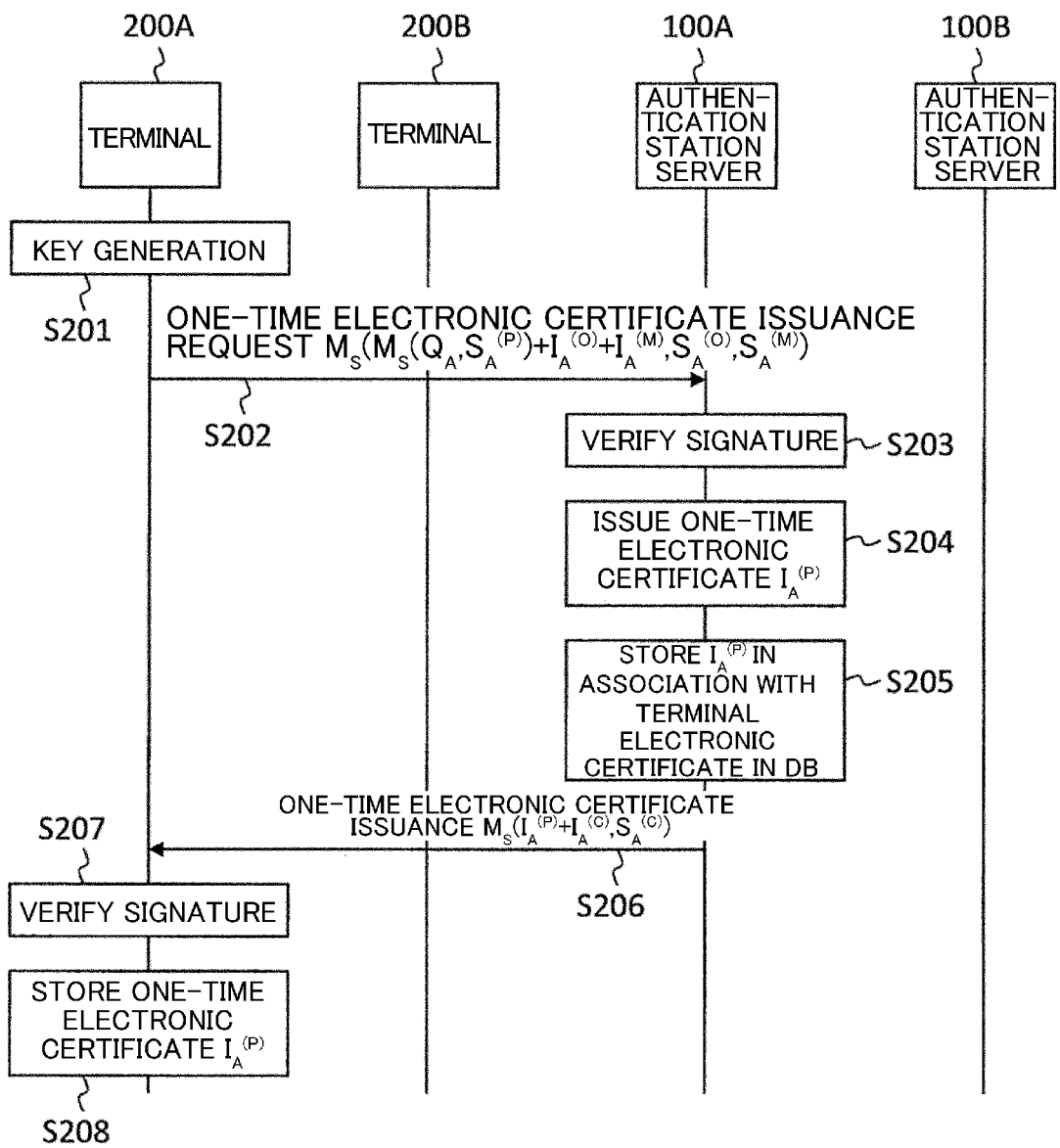
FIG. 8 is a sequence diagram of processing for issuing a one-time electronic certificate according to the present embodiment.

FIG. 8 is a sequence diagram showing processing for issuing a one-time electronic certificate according to the present embodiment. Processing in which the authentication station server 100A issues the one-time electronic certificate to the terminal 200A will be described with reference to FIG. 8.

In step S201, the electronic certificate request unit 211 of the terminal 200A generates a key pair (a secret key and a public key) for public key encryption.

In step S202, the electronic certificate request unit 211 transmits a request to issue the one-time electronic certificate including the public key generated in step S201 to the authentication station server 100A. Specifically, the electronic certificate request unit 211 generates $M_s(Q_A, S_A^{(P)})$, which includes a public key and is obtained by signing an issuance request application $Q_A$ for the one-time electronic certificate with the secret key generated in step S201. Next, the electronic certificate request unit 211 generates $M_s(M_s(Q_A, S_A^{(P)}) + I_A^{(O)} I_A^{(M)}, S_A^{(O)}, S_A^{(M)})$ by combining the owner electronic certificate $I_A^{(O)}$ and model number electronic certificate $I_A^{(M)}$ of the terminal 200A with the signed data, and signing the result using the secret key $S_A^{(O)}$ of the owner electronic certificate and the secret key $S_A^{(M)}$ of the model number electronic certificate of the terminal 200A. The electronic certificate request unit 211 transmits $M_s(M_s(Q_A, S_A^{(P)}) + I_A^{(O)} + I_A^{(M)}, S_A^{(O)}, S_A^{(M)})$ to the authentication station server 100A as a request to issue the one-time electronic certificate.

In step S203, the electronic certificate issuance unit 111 of the authentication station server 100A verifies the signatures provided using the secret keys $S_A^{(M)}$, $S_A^{(O)}$, and $S_A^{(P)}$ of the request to issue the one-time electronic certificate received in step S202.

In step S204, the electronic certificate issuance unit 111 issues the one-time electronic certificate $I_A^{(P)}$ including the public key included in $Q_A$ received in step S202. The key owner of the one-time electronic certificate is a random character string.

In step S205, the electronic certificate issuance unit 111 stores the one-time electronic certificate $I_A^{(P)}$ in association with the owner electronic certificate $I_A^{(O)}$. Specifically, the electronic certificate issuance unit 111 adds a record to the electronic certificate database 130 (see FIG. 4) and stores the serial number of the one-time electronic certificate issued in the identification information 131. Furthermore, the electronic certificate issuance unit 111 stores "one-time" in the type 132, the key owner in the key owner 133, "-" in the identity confirmation information 135, and the data of the issued one-time electronic certificate in the electronic certificate 136. The electronic certificate issuance unit 111 stores the serial number of the owner electronic certificate $I_A^{(O)}$ received in step S202 in the related certificate 134. The authentication station server 100 accesses the identity confirmation information for the owner of the terminal 200 for which the one-time electronic certificate was issued, by referencing the identity confirmation information 135 of the electronic certificate corresponding to the related certificate 134 of the one-time electronic certificate.

In step S206, the electronic certificate issuance unit 111 transmits the issued one-time electronic certificate $I_A^{(P)}$ as a response to the terminal 200A. Specifically, the electronic certificate issuance unit 111 combines the electronic certificate $I_A^{(C)}$ of the authentication station server 100A with the one-time electronic certificate $I_A^{(P)}$ and transmits $M_s(I_A^{(P)}+I_A^{(C)}, S_A^{(C)})$ signed using the secret key $S_A^{(C)}$ corresponding to the electronic certificate $I_A^{(C)}$ as a response to the request made in step S202.

In step S207, the electronic certificate request unit 211 of the terminal 200A verifies the signature provided using the secret key $S_A^{(C)}$ of the received $M_s(I_A^{(P)}+I_A^{(C)}, S_A^{(C)})$ and the signature of the one-time electronic certificate $I_A^{(P)}$.

In step S208, the electronic certificate request unit 211 of the terminal 200A stores the one-time electronic certificate $I_A^{(P)}$ in the storage unit 220.

The foregoing described processing in which the authentication station server 100A issues a one-time electronic certificate to the terminal 200A. Similarly, the authentication station server 100B issues the one-time electronic certificate to the terminal 200B. The processing in which the authentication station server 100B issues the one-time electronic certificate to the terminal 200B is similar to that of FIG. 8, and therefore description thereof is omitted. In this state, the terminals 200A and 200B store the one-time electronic certificate and the secret key corresponding thereto. Also, the authentication station servers 100A and 100B store the one-time electronic certificate in association with the owner electronic certificate, and consequently, in association with the identity confirmation information.

Owner Sameness Confirmation Processing: Processing Between Terminals

After the terminal 200A and the partner terminal 200B for which the sameness of the owners is to be confirmed obtain the one-time electronic certificate, the terminal 200A requests confirmation of the sameness of the owner to the authentication station server 100A. Before the request is made, the terminals 200A and 200B perform mutual confirmation, and thereafter determine the item of the identity confirmation information for confirming the sameness. For example, the terminals 200A and 200B use an item held in common in the pieces of identity confirmation information registered in both authentication station servers 100A and 100B as the item of the identity confirmation information for confirming the sameness.

Processing that is performed after the terminals 200A and 200B determine the item of the identity confirmation information for confirming the sameness, and immediately before the terminal 200A requests the confirmation of the sameness of the owner to the authentication station server 100A, will be described with reference to FIG. 9, which will be described later. Next, processing in which the terminal 200A requests confirmation of the sameness of the owner to the authentication station server 100A will be described with reference to FIG. 10, which will be described later.

Figure 9:
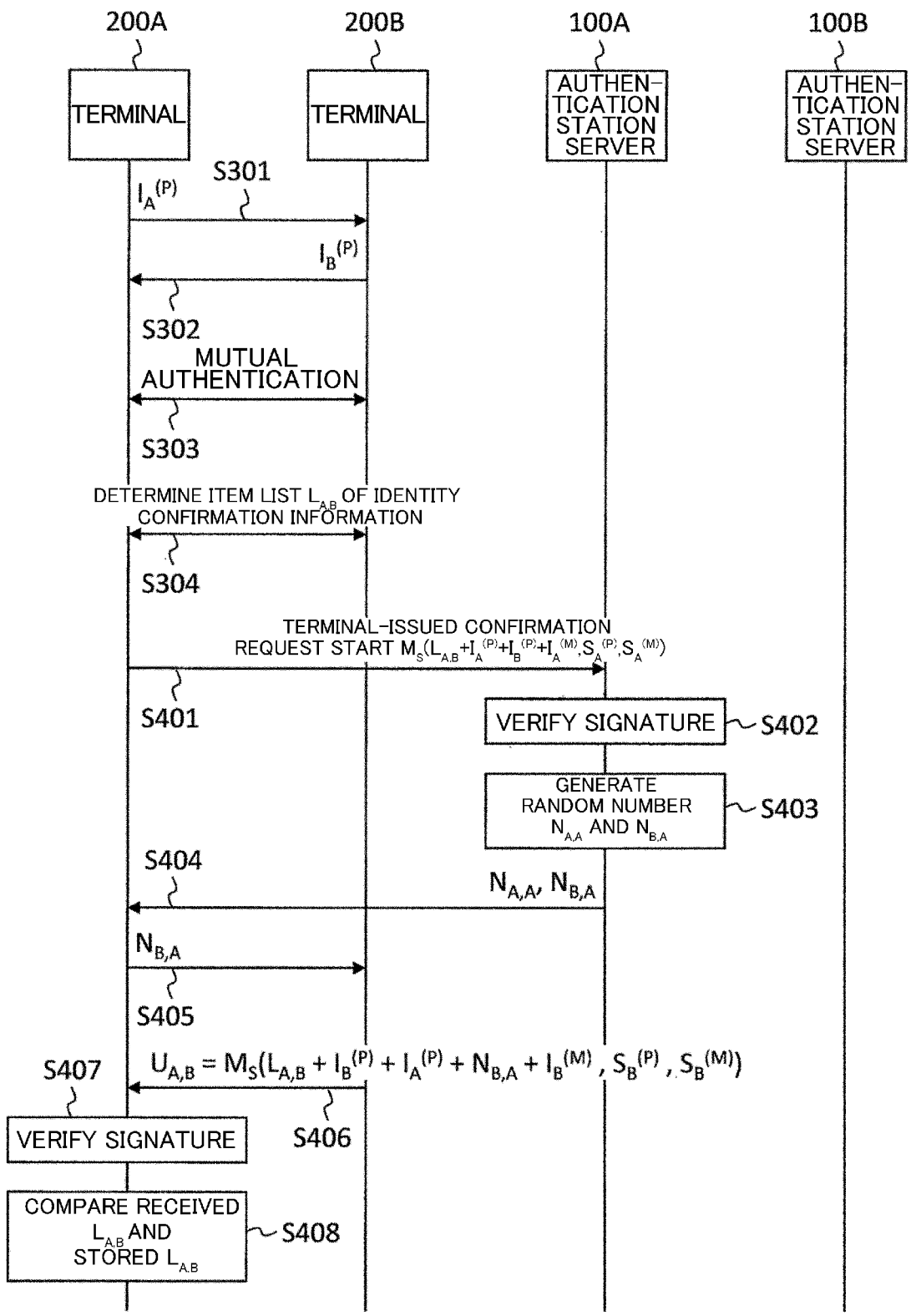
FIG. 9 is a sequence diagram (1) of owner sameness confirmation processing according to the present embodiment.

FIG. 9 is a sequence diagram (1) for owner sameness confirmation processing according to the present embodiment. Mainly the processing performed between the terminals 200A and 200B in the owner sameness confirmation processing will be described with reference to FIG. 9.

In step S301, the terminal authentication unit 212 of the terminal 200A transmits the one-time electronic certificate $I_A^{(P)}$ to the partner terminal 200B. The terminal 200B verifies the signature of the received one-time electronic certificate $I_A^{(P)}$.

In step S302, the terminal authentication unit 212 of the terminal 200B transmits the one-time electronic certificate $I_B^{(P)}$ to the partner terminal 200A. The terminal 200A verifies the signature of the received one-time electronic certificate $I_B^{(P)}$.

In step S303, the terminal authentication units 212 of the terminal 200A and 200B authenticate each other using the secret keys $S_A^{(P)}$ and $S_B^{(P)}$ corresponding to the one-time electronic certificate. For example, the terminal 200A generates the random number, transmits the random number to the terminal 200B, and requests a signature provided using the secret key corresponding to the one-time electronic certificate $I_B^{(P)}$ for the random number. The terminal 200A can authenticate that the terminal 200B has a secret key corresponding to the one-time electronic certificate $I_B^{(P)}$ by verifying the signature generated by the terminal 200B. Similarly, the terminal 200B can authenticate that the terminal 200A has the secret key corresponding to the one-time electronic certificate $I_A^{(P)}$.

In step S304, the terminal authentication unit 212 determines the item list L$_{A,B}$ of the identity confirmation information for confirming the sameness. Specifically, the terminal authentication unit 212 uses items held in common between the identity confirmation information registered in both authentication station servers 100A and 100B as the item list $L_{A,B}$ of the identity confirmation information.

In the step S401, the confirmation request start unit 213 of the terminal 200A transmits the terminal-issued confirmation request start message to the authentication station server 100A. Specifically, the confirmation request start unit 213 generates the $M_s(L_{A,B}+I_A^{(P)}+I_B^{(P)}+I_A^{(M)}, S_A^{(P)}, S_A^{(M)})$ by combining the item list $L_{A,B}$ of the identity confirmation information, the one-time electronic certificates $I_A^{(P)}$ and $I_B^{(P)}$ of the terminals 200A and 200B, and the model number electronic certificate $I_A^{(M)}$ and signing using the secret key $S_A^{(P)}$ of the one-time electronic certificate and the secret key $S_A^{(M)}$ of the model number electronic certificate of the terminal 200A. The confirmation request start unit 213 transmits $M_s(L_{A,B}+I_A^{(P)}+I_B^{(P)}+I_A^{(M)}, S_A^{(P)}, S_A^{(M)})$ as the terminal-issued confirmation request start message to the authentication station server 100A.

In step S402, the confirmation reception unit 112 of the authentication station server 100A verifies the signatures provided using the secret keys $S_A^{(M)}$ and $S_A^{(P)}$ of the terminal-issued confirmation request start message.

In step S403, the confirmation reception unit 112 generates a random number $N_{A,A}$ and a random number $N_{B,A}$.

In step S404, the confirmation reception unit 112 transmits the random number $N_{A,A}$ and the random number $N_{B,A}$ as a response to the request made in step S401.

In step S405, the confirmation request start unit 213 of the terminal 200A transmits the random number $N_{B,A}$ to the terminal 200B.

In step S406, the confirmation request start response unit 214 of the terminal 200B transmits $M_s(L_{A,B}+I_B^{(P)}+I_A^{(P)}+N_{B,A}+I_B^{(M)}, S_B^{(P)}, S_B^{(M)})$, which is obtained by combining the item list $L_{A,B}$ of the identity confirmation information stored in the terminal 200B, the one-time electronic certificates $I_B^{(P)}$ and $I_A^{(P)}$ of the terminal 200A and the partner terminal 200A, the random number $N_{B,A}$, and the model number electronic certificate $I_B^{(M)}$ and signing using the secret keys $S_B^{(P)}$ and $S_B^{(M)}$, as a response to the terminal 200A. Hereinafter, $M_s(L_{A,B}+I_B^{(P)}+I_A^{(P)}+N_{B,A}+I_B^{(M)}, S_B^{(P)}, S_B^{(M)})$ will be written also as $U_{A,B}$.

In step S407, the confirmation request transmission unit 215 of the terminal 200A verifies the signatures provided using the secret keys $S_B^{(M)}$ and $S_B^{(P)}$ of $U_{A,B}$.

In step S408, the confirmation request transmission unit 215 confirms that $L_{A,B}$ received in step S406 and the item list $L_{A,B}$ that was determined in step S304 and stored in the terminal 200A match each other. If they do not match, the confirmation request transmission unit 215 cancels the owner sameness confirmation processing.

Figure 10:
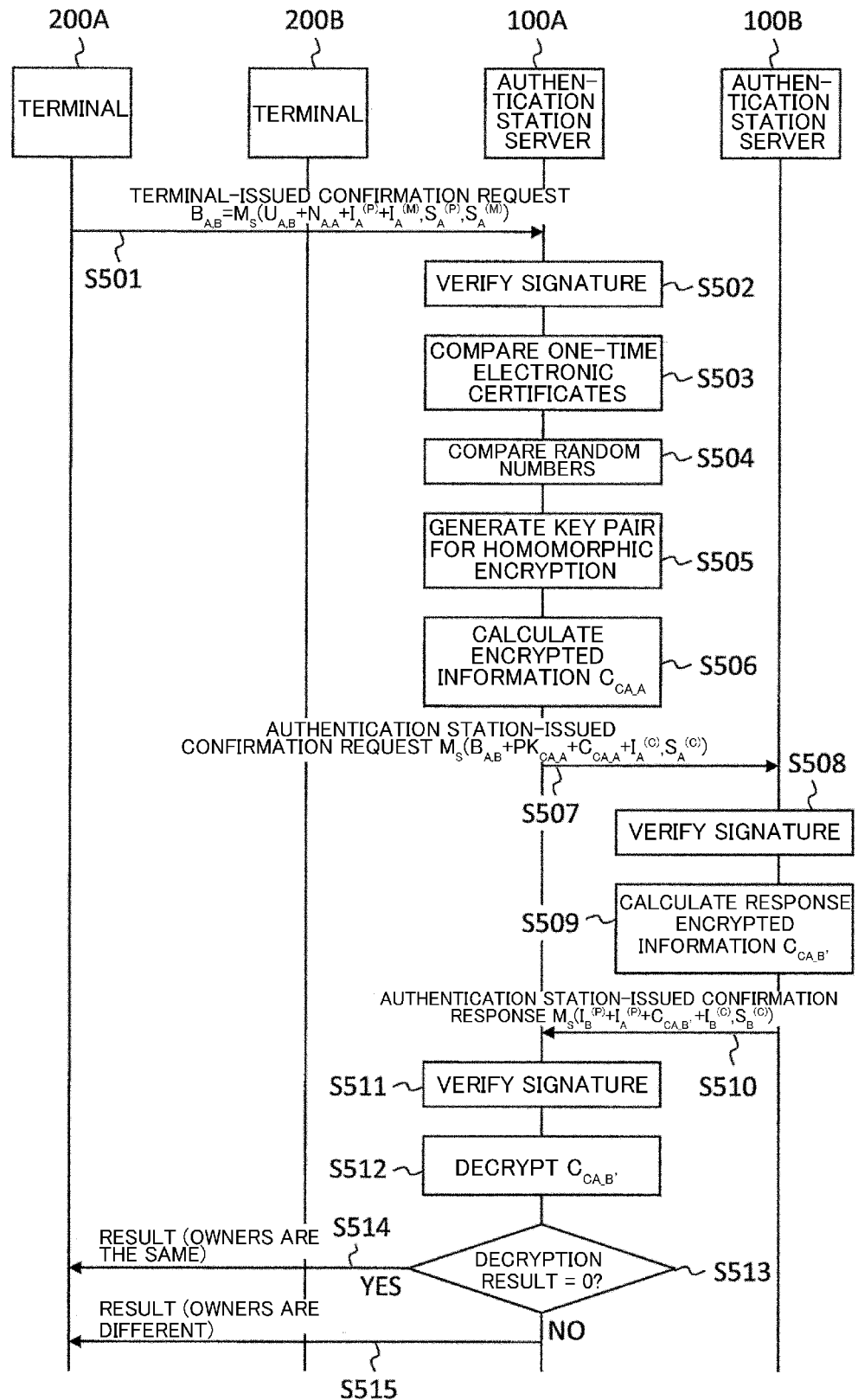
FIG. 10 is a sequence diagram (2) of owner sameness confirmation processing according to the present embodiment.

Owner Sameness Confirmation Processing: Processing Between Authentication Station Servers FIG. 10 is a sequence diagram (2) of owner sameness confirmation processing according to the present embodiment. Mainly the processing between the authentication station servers 100A and 100B in the owner sameness confirmation processing will be described with reference to FIG. 10.

In step S501, the confirmation request transmission unit 215 of the terminal 200A transmits the terminal-issued confirmation request message to the authentication station server 100A. Specifically, the confirmation request transmission unit 215 transmits $M_s(U_{A,B}+N_{A,A}I_A^{(P)}+I_A^{(M)},S_A^{(P)},S_A^{(M)})$, which is obtained by combining $U_{A,B}$, the random number $N_{A,A}$, the one-time electronic certificate $I_A^{(P)}$, and the model number electronic certificate $I_A^{(M)}$, and signing using the secret keys $S_A^{(P)}$ and $S_A^{(M)}$, to the authentication station server 100A. Hereinafter, $M_s(U_{A,B}+N_{A,A}+I_A^{(P)}+I_A^{(M)},S_A^{(P)},S_A^{(M)})$ will also be written as "$B_{A,B}$".

In step S502, the confirmation request unit 113 of the authentication station server 100A verifies the signatures provided using the secret keys $S_A^{(M)}$ and $S_A^{(P)}$ of $B_{A,B}$. Also, the confirmation request unit 113 verifies the signatures provided using the secret keys $S_B^{(M)}$ and $S_B^{(P)}$ of $U_{A,B}$ included in $B_{A,B}$.

In step S503, the confirmation request unit 113 compares whether or not the one-time electronic certificate $I_A^{(P)}$ included in the terminal-issued confirmation request message is the same as the one-time electronic certificate $I_A^{(P)}$ included in step S401 (see FIG. 9). If they are not the same, the confirmation request unit 113 cancels the owner sameness confirmation processing.

In step S504, the confirmation request unit 113 verifies whether or not the random number $N_{A,A}$ included in $B_{A,B}$ and the random number $N_{B,A}$ included in $U_{A,B}$ of $B_{A,B}$ are respectively the same as the random number $N_{A,A}$ and the random number $N_{B,A}$ transmitted in step S404 (see FIG. 9). If they are not the same, the confirmation request unit 113 cancels the owner sameness confirmation processing.

In step S505, the confirmation request unit 113 generates a key pair (a secret key and a public key) for homomorphic encryption.

In step S506, the confirmation request unit 113 calculates the encrypted information $C_{CA\_A}$ using homomorphic encryption. Specifically, the confirmation request unit 113 acquires the one-time electronic certificate $I_A^{(P)}$ included in the terminal-issued confirmation request message and the item list $L_{A,B}$ of the identity confirmation information included in $U_{A,B}$. The confirmation request unit 113 specifies the owner electronic certificate $I_A^{(O)}$ of the terminal 200A from the related certificate 134 of the record of the one-time electronic certificate $I_A^{(P)}$ in the electronic certificate database 130, and acquires the identity confirmation information 135 thereof. Next, the confirmation request unit 113 calculates the encrypted information $C_{CA\_A}$ by acquiring the identity confirmation information corresponding to the item list $L_{A,B}$ from the identity confirmation information 135.

In step S507, the confirmation request unit 113 transmits an authentication station-issued confirmation request message to the authentication station server 100B. Specifically, the confirmation request unit 113 transmits $M_s(B_{A,B}+PK_{CA\_A}+C_{CA\_A}+I_A^{(C)},S_A^{(C)})$, which is obtained by combining $B_{A,B}$, the public key $PK_{CA\_A}$, for homomorphic encryption, the encrypted information $C_{CA\_A}$, and the authentication station electronic certificate $I_A^{(C)}$ and signing using the secret key $S_A^{(C)}$, to the authentication station server 100B. Note that the authentication station server 100B can perform specification based on the authentication station (issuer) that issued the one-time electronic certificate $I_B^{(P)}$ included in $U_{A,B}$ in $B_{A,B}$.

In step S508, the confirmation response unit 114 of the authentication station server 100B verifies the signature provided using the secret key $S_A^{(C)}$ of the authentication station-issued confirmation request message.

In step S509, the confirmation response unit 114 generates response encrypted information $C_{CA\_B}'$ based on the received encrypted information $C_{CA\_A}$ and the identity confirmation information held by the authentication station server 100B. Specifically, the confirmation response unit 114 acquires the one-time electronic certificate $I_B^{(P)}$ included in $U_{A,B}$ in $B_{A,B}$ and the item list $L_{A,B}$ of the identity confirmation information. The confirmation response unit 114 specifies the owner electronic certificate $I_B^{(O)}$ of the terminal 200B from the related certificate 134 of the record of the one-time electronic certificate $I_B^{(P)}$ in the electronic certificate database 130, and acquires the identity confirmation information 135 thereof. Next, the confirmation response unit 114 acquires the identity confirmation information in the item list $L_{A,B}$ of the identity confirmation information from the identity confirmation information 135. Finally, the confirmation response unit 114 generates the response encrypted information $C_{CA\_B}'$ based on the encrypted information $C_{CA\_A}$, the public key $PK_{CA\_A}$, and the acquired identity confirmation information.

In step S510, the confirmation response unit 114 transmits $MS(I_B^{(P)}+I_A^{(P)}+C_{CA\_B}'+I_B^{(C)},S_B^{(C)})$, which is obtained by combining the one-time electronic certificates $I_B^{(P)}$ and $I_A^{(P)}$, the response encrypted information $C_{CA\_B}'$, and the authentication station electronic certificate $I_B^{(C)}$ and signing using the secret key $S_B^{(C)}$, as an authentication station-issued confirmation response message to the authentication station server 100A.

In step S511, the result notification unit 115 of the authentication station server 100A verifies the signature provided using the secret key $S_B^{(C)}$ of the authentication station-issued confirmation response message.

In step S512, the result notification unit 115 decrypts the response encrypted information $C_{CA\_B}'$ using the secret key for homomorphic encryption.

In step S513, if the decryption result is 0 (step S513→YES), the result notification unit 115 advances to step S514, and if the decryption result is not 0 (step S513→NO), the result notification unit 115 advances to step S515. Note that a decryption result of 0 is a predetermined value in the case where the homomorphic encryption is Paillier encryption (homomorphic encryption in which the product of the encrypted texts is the encryption of the sum of unencrypted texts). In the case of homomorphic encryption in which the product of the cipher tests is the encryption of the product of the unencrypted texts, determination is performed based on whether or not the decryption result is 1.

In step S514, the result notification unit 115 transmits an authentication result indicating that the owners are the same as a response to the terminal 200A.

In step S515, the result notification unit 115 transmits an authentication result indicating that the owners do not match to the terminal 200A.

The authentication results of step S514 and S515 are received by the result reception unit 216 of the terminal 200A.

With that, the terminal 200A ends the owner sameness confirmation processing for confirming that the owner of the terminal 200A and the owner of the partner terminal 200B match each other in the authentication station server 100A. Next, the terminals 200A and 200B are switched, and the terminal 200B confirms that the owner of the terminal 200B and the owner of the partner terminal 200A match each other. Specifically, similarly to the steps of step S401 and onward, the terminal 200B confirms that the owner of the terminal 200B and the owner of the partner terminal 200A match each other in the authentication station server 100B. This processing for confirming is similar to that of the steps of step S401 and onward according to FIGS. 9 and 10, and therefore description thereof is omitted.

Both of the terminals 200A and 200B confirm that the owners are the same, whereby the owner sameness confirmation processing ends. After the end of the owner sameness confirmation processing, the terminals 200A and 200B performs sharing (copy) processing of a secret key to be used for authentication during, for example, service usage, data that is needed for content copyright management, and the like.

Features of Owner Sameness Certificate Processing

The one-time electronic certificate and the model number electronic certificate are examples of terminal information of the terminal that is to be transmitted to the partner terminal for which the sameness of the owner is to be confirmed. Information regarding the owner is not included in any electronic certificate. For this reason, there is no risk that personal information including the identity confirmation information of the owner will leak out to the partner terminal.

Even if the authentication station servers are different, it is possible to confirm whether or not the owners of two terminals are the same by comparing the item of the identity confirmation information that is stored in common. Also, the identity confirmation information (see the identity confirmation information 135 in FIG. 4) is authentic information acquired from the identity confirmation document (see steps S103 and S104 in FIG. 7), and the owner sameness confirmation system 10 confirms the sameness of the owners based on highly-reliable identity confirmation information.

Between the authentication station servers, the item of the identity confirmation information stored in the respective authentication station servers are compared in the encrypted state using homomorphic encryption. For this reason, it is possible to confirm whether or not the identity confirmation information matches without the identity confirmation information flowing out to the partner authentication station.

The authentication station server acquires the model number electronic certificate, and therefore it is possible to find out the model numbers (models) of the two terminals for which the sameness of the owners is to be confirmed, and it is possible to obtain information for improving the service.

Variation: Item List of Identity Confirmation Information

The item list $L_{A,B}$ of the identity confirmation information is the items of the identity confirmation information stored in the authentication station servers of both terminals 200A and 200B (see the description of the terminal authentication unit 212 of FIG. 6 and step S304 in FIG. 9). The terminal 200 may also determine the item list $L_{A,B}$ according to the degree of importance of the data to be shared after the sameness confirmation. For example, if a secret key for accessing a financial service is shared, the terminal 200 uses an address and a name as the item list $L_{A,B}$. Also, in the case of sharing a secret key for accessing a service with a family discount between family members that live together, the terminal 200 uses only an address of the item list $L_{A,B}$.

Note that if the identity confirmation information (item of the identity confirmation information) for which sameness is to be confirmed has been determined in advance, the terminal 200 or the authentication station server 100 may also execute the processing for owner sameness confirmation without using the item list $L_{A,B}$.

Variation: Model Number Electronic Certificate

The terminal-issued confirmation request message (step S501 in FIG. 10) and the authentication station-issued confirmation request message (step S507 in FIG. 10) include the model number electronic certificate, and the authentication station server 100 can acquire the model number of the terminal 200 by verifying the signature of the secret key corresponding to the model number electronic certificate. Provision of the model number electronic certificate or the corresponding signature may also be omitted. A signature provided using a secret key corresponding to the one-time electronic certificate is provided in the message, and thus security is ensured.

Variation: Electronic Certificate Database

In the above-described embodiment, there is no information in the identity confirmation information 135 in the record of the one-time electronic certificate stored in the electronic certificate database 130 (FIG. 4). Instead, the confirmation response unit 114 acquires the identity confirmation information from the identity confirmation information 135 of the record of the owner electronic certificate shown in the related certificate 134 (see step S509 in FIG. 10).

In contrast to this, the identity confirmation information 135 of the record of the owner electronic certificate shown in the related certificate 134 may also be stored in the identity confirmation information 135 of the record of the one-time electronic certificate. The authentication station server 100 can acquire the identity confirmation information directly from the record of the one-time time electronic certificate.

Other Variations

Note that the present invention is not limited to the above-described embodiment and can be modified without departing from the gist of the invention.

For example, although the authentication station server 100 generates the key pair for homomorphic encryption each time owner sameness confirmation processing is performed (see step S505 of FIG. 10), a key pair that was generated before may also be re-used.

Also, the key owner of the one-time electronic certificate is a random character string, but need only be information that is unrelated to the identity confirmation information of the owner, and for example, may also be information generated based on the address of the terminal, a time at which there was a request to issue the electronic certificate, and the like.

In addition, in the above-described embodiment, the server that issues the electronic certificate and the server that confirms the sameness of the owners were the same authentication station server 100, but they may also be separate servers.

Also, in step S103 (see FIG. 7), the authentication station server 100 confirms the identity confirmation document, but confirmation may also be performed manually online.

Although several embodiments of the present invention were described above, these embodiments are merely exemplary and do not limit the technical scope of the present invention. The present invention can take various other embodiments, and furthermore, various modifications such as omission and replacement can be performed without departing from the gist of the present invention. These embodiments and variations are encompassed in the scope and gist of the invention described in the present specification and the like, and are encompassed in the invention described in the patent claims and its range of equivalency.

Effects

Hereinafter, effects of the owner sameness confirmation system 10 will be described.

The owner sameness confirmation system 10 according to the present embodiment is an owner sameness confirmation system 10 constituted by including a plurality of terminals 200 and a plurality of authentication station servers 100, in which a terminal 200A includes a confirmation request transmission unit 215 configured to transmit, to an authentication station server 100A that issued an electronic certificate to the terminal 200A, a terminal-issued confirmation request message including an electronic certificate of a partner terminal 200B that is a target of owner sameness confirmation, the authentication station server 100A that issued an electronic certificate to the terminal 200A includes: a storage unit 120 configured to store the electronic certificate issued to the terminal 200A and identity confirmation information 135 of an owner of the terminal 200A in association with each other; and a confirmation request unit 113 configured to, upon receiving the terminal-issued confirmation request message, transmit an authentication station-issued confirmation request message including encrypted information obtained by encrypting the identity confirmation information of the owner of the terminal 200A using a public key for homomorphic encryption, the electronic certificate of the partner terminal 200B, and the public key to an authentication station server 100B that issued the electronic certificate of the partner terminal 200B, the authentication station server 100B that issued the electronic certificate of the partner terminal 200B includes: a storage unit 120 configured to store the electronic certificate issued to the partner terminal 200B and identity confirmation information 135 of an owner of the partner terminal 200B in association with each other; and a confirmation response unit configured to, upon receiving the authentication station-issued confirmation request message, acquire the identity confirmation information of the owner of the partner terminal 200 from the electronic certificate of the partner terminal 200 and transmit response encrypted information, which is the result of calculating an encrypted text obtained by encrypting the identity confirmation information using the public key and the encrypted information through computation corresponding to the homomorphic encryption, as a response to the transmission source of the authentication station-issued confirmation request message, and the authentication station server 100A that issued the electronic certificate to the terminal 200A further includes: a result notification unit configured to decrypt the response encrypted information, determine whether or not the identity confirmation information of the owner of the terminal 200A and the identity confirmation information of the owner of the partner terminal 200B match each other based on whether or not the decryption result matches a predetermined value, and notify the terminal 200A of the determination result.

According to this kind of owner sameness confirmation system 10, the authentication station server 100 that issued the electronic certificate can determine whether or not the owners are the same for the multiple different terminals 200. Also, the identity confirmation information is encrypted and exchanged (the encrypted information and the response encrypted information), the authentication station server 100 can confirm whether or not the identity confirmation information matches without the identity confirmation information itself flowing out to the partner authentication station server 100.

Accordingly, with the owner sameness confirmation system 10, it is possible to enable owner sameness confirmation between terminals while ensuring security.

The authentication station server 100 according to the present embodiment is an authentication station server 100 for an owner sameness confirmation system 10 constituted by including a plurality of terminals 200 and a plurality of authentication station servers 100, the authentication station server 100 including: a storage unit 120 configured to store an electronic certificate issued to the terminal 200 and identity confirmation information 135 of an owner of the terminal 200 in association with each other; and a confirmation request unit 113 configured to, upon receiving a terminal-issued confirmation request message including an electronic certificate of a partner terminal 200B that is a target of owner sameness confirmation from the terminal 200A, transmit an authentication station-issued confirmation request message including encrypted information obtained by encrypting the identity confirmation information of the owner of the terminal 200A using a public key for homomorphic encryption, the electronic certificate of the partner terminal 200B, and the public key, to an authentication station server 100B that issued the electronic certificate of the partner terminal 200B; a confirmation response unit 114 configured to, upon receiving the authentication station-issued confirmation request message, acquire the identity confirmation information of the owner of the partner terminal 200B from the electronic certificate of the partner terminal 200B and transmit response encrypted information, which is the result of calculating an encrypted text obtained by encrypting the identity confirmation information using the public key and the encrypted information through computation corresponding to the homomorphic encryption, as a response to the transmission source of the authentication station-issued confirmation request message; and a result notification unit 115 configured to decrypt the response encrypted information, determine whether or not the identity confirmation information of the owner of the terminal 200A and the identity confirmation information of the owner of the partner terminal 200B match each other based on whether or not the decryption result matches a predetermined value, and notify the terminal 200 of the determination result.

According to this kind of authentication station server 100, the authentication station server 100 that issued the electronic certificate can determine whether or not the owners are the same for the multiple terminals 200. Also, the identity confirmation information is encrypted and exchanged (the encrypted information and the response encrypted information), the authentication station server 100 can confirm whether or not the identity confirmation information matches without the identity confirmation information itself flowing out to the partner authentication station server 100.

Accordingly, with the authentication station server 100, it is possible to enable owner sameness confirmation between terminal while ensuring security.

In the authentication station server 100 according to the present embodiment, the identity confirmation information 135 is constituted by one or more items, the terminal-issued confirmation request message includes an item for confirming the sameness of the identity confirmation information, the item being selected from among the one or more items by the terminal 200, the confirmation request unit 113 calculates the encrypted information by encrypting the identity confirmation information for the item of the owner of the terminal 200 using the public key, and transmits the item in a state of being included in the authentication station-issued confirmation request message, the confirmation response unit 114 generates the encrypted text obtained by acquiring the identity confirmation information for the item of the owner of the partner terminal 200 from the storage unit 120 and encrypting the identity confirmation information using the public key, calculates the response encrypted information, and transmits the calculated response encrypted information as a response, and the result notification unit 115 decrypts the response encrypted information and determines whether or not the identity confirmation information for the item of the owner of the terminal 200 and the identity confirmation information for the item of the owner of the partner terminal 200 match each other based on whether or not the decryption result matches the predetermined value.

According to this kind of authentication station server 100, it is possible to confirm the sameness of the owners using not all but part (an item) of the identity confirmation information. For this reason, even if the terminals 200 have different registered identity confirmation information, it is possible to confirm the sameness of the owners due to parts of the identity confirmation information matching.

In the authentication station server 100 according to the present embodiment, E, which is the homomorphic encryption, is homomorphic encryption in which $E(M1) \times E(M2)=E(M1+M2)$ is satisfied for unencrypted texts M1 and M2, and the confirmation request unit 113 transmits E(V1) as the encrypted information for identity confirmation information V1 of the owner of the terminal 200A, the confirmation response unit 114 generates a random number r for identity confirmation information V2 of the owner of the partner terminal 200B, and transmits $E(V1)^r \times E(V2)^{-r}$ as the response encrypted information as a response, and the result notification unit 115 determines whether or not V1 and V2 match each other based on whether or not the decryption result of the response encrypted information is 0, which is the predetermined value.

According to this kind of authentication station server 100, the authentication station server 100 can confirm whether or not the identity confirmation information matches using the homomorphic encryption E that satisfies $E(M1) \times E(M2)=E(M1+M2)$ with respect to the unencrypted texts M1 and M2.

Also, when the pieces of identity confirmation information V1 and V2 are different from each other, $(V1-V2) \neq 0$ is satisfied, and therefore for the authentication station server 100A, the decryption result $r(V1-V2)$ of the response encrypted information is a random number. For this reason, even if the authentication station server 100A knows the identity confirmation information V1, it cannot obtain the information of the identity confirmation information V2, and thus the identity confirmation information V2 of the partner authentication station server 100B does not leak out. The same applies even when the authentication station server 100A and 100B are switched.

In the authentication station server 100 according to the present embodiment, E, which is the homomorphic encryption, is homomorphic encryption in which $E(M1) \times E(M2)=E(M1 \times M2)$ is satisfied for unencrypted texts M1 and M2, and the confirmation request unit 113 transmits E(V1) as the encrypted information for identity confirmation information V1 of the owner of the terminal 200A, the confirmation response unit 114 generates a random number r for identity confirmation information V2 of the owner of the partner terminal 200B, and transmits $E(V1)^r \times E(V2)^{-r}$ as the response encrypted information as a response, and the result notification unit 115 determines whether or not V1 and V2 match each other based on whether or not the decryption result of the response encrypted information is 1, which is the predetermined value.

According to this kind of authentication station server 100, the authentication station server 100 can confirm whether or not the identity confirmation information matches using the homomorphic encryption E that satisfies $E(M1) \times E(M2)=E(M1 \times M2)$ with respect to the unencrypted texts M1 and M2.

Also, when the pieces of identity confirmation information V1 and V2 are different from each other, $(V1/V2) \neq 1$ is satisfied, and therefore for the authentication station server 100A, the decryption result $(V1/V2)^r$ of the response encrypted information is a random number. For this reason, even if the authentication station server 100A knows the identity confirmation information V1, it cannot obtain the information of the identity confirmation information V2, and thus the identity confirmation information V2 of the partner authentication station server 100B does not leak out. The same applies even when the authentication station servers 100A and 100B are switched.

In the authentication station server 100 according to the present embodiment, a value of a key owner included in the electronic certificate issued to the terminal 200 is identification information of the terminal 200 that is unrelated to the identity confirmation information of the owner of the terminal 200.

According to this kind of authentication station server 100, it is possible to determine whether or not the owners of the two terminals 200 are the same using a one-time certificate that does not include the identity confirmation information of the owner. For this reason, the terminal 200 can confirm the sameness of the users without leaking the identity confirmation information of the owner of the terminal 200 to the partner terminal 200.

In the authentication station server 100 according to the present embodiment, the terminal-issued confirmation request message received from the terminal 200 is signed using at least one of a secret key corresponding to the electronic certificate and a secret key corresponding to a model number electronic certificate indicating a model number of the terminal 200.

According to this kind of authentication station server 100, the authentication station server 100 can acquire the model number (model) of the terminal 200. For this reason, the user of the authentication station server 100 can obtain information for service improvement.

REFERENCE SIGNS LIST

10 Owner sameness confirmation system
100, 100A, 100B Authentication station server
110 Control unit
111 Electronic certificate issuance unit
112 Confirmation reception unit
113 Confirmation request unit
114 Confirmation response unit
115 Result notification unit
120 Storage unit
130 Electronic certificate database
150 Input/output unit
200, 200A, 200B Terminal
210 Control unit
211 Electronic certificate request unit
212 Terminal authentication unit
213 Confirmation request start unit
214 Confirmation request start response unit
215 Confirmation request transmission unit
216 Result reception unit
220 Storage unit
250 Input/output unit

The invention claimed is:

1. An owner sameness confirmation system including a plurality of terminals and a plurality of authentication station servers, wherein
each terminal includes a confirmation request transmission unit, including one or more processors, configured to transmit, to an authentication station server that issued an electronic certificate to the terminal, a terminal-issued confirmation request message including an electronic certificate of a partner terminal that is a target of owner sameness confirmation,
the authentication station server that issued an electronic certificate to the terminal includes:
a first storage unit configured to store the electronic certificate issued to the terminal and identity confirmation information of an owner of the terminal in association with each other; and
a confirmation request unit, including one or more processors, configured to, upon receiving the terminal-issued confirmation request message, transmit an authentication station-issued confirmation request message including encrypted information obtained by encrypting the identity confirmation information of the owner of the terminal using a public key for homomorphic encryption, the electronic certificate of the partner terminal, and the public key to an authentication station server that issued the electronic certificate of the partner terminal,
the authentication station server that issued the electronic certificate of the partner terminal includes:
a second storage unit configured to store the electronic certificate issued to the partner terminal and identity confirmation information of an owner of the partner terminal in association with each other; and
a confirmation response unit, including one or more processors, configured to, upon receiving the authentication station-issued confirmation request message, acquire the identity confirmation information of the owner of the partner terminal from the electronic certificate of the partner terminal and transmit response encrypted information, which is the result of calculating an encrypted text obtained by encrypting the identity confirmation information using the public key and the encrypted information through computation corresponding to the homomorphic encryption, as a response to the transmission source of the authentication station-issued confirmation request message, and
the authentication station server that issued the electronic certificate to the terminal further includes:
a result notification unit, including one or more processors, configured to decrypt the response encrypted information, determine whether or not the identity confirmation information of the owner of the terminal and the identity confirmation information of the owner of the partner terminal match each other based on whether or not the decryption result matches a predetermined value, and notify the terminal of the determination result.

2. An authentication station server for an owner sameness confirmation system including a plurality of terminals and a plurality of authentication station servers, the authentication station server comprising:
a storage unit configured to store an electronic certificate issued to the terminal and identity confirmation information of an owner of the terminal in association with each other; and
a confirmation request unit, including one or more processors, configured to, upon receiving a terminal-issued confirmation request message including an electronic certificate of a partner terminal that is a target of owner sameness confirmation from the terminal, transmit an authentication station-issued confirmation request message including encrypted information obtained by encrypting the identity confirmation information of the owner of the terminal using a public key for homomorphic encryption, the electronic certificate of the partner terminal, and the public key, to an authentication station server that issued the electronic certificate of the partner terminal;
a confirmation response unit, including one or more processors, configured to, upon receiving the authentication station-issued confirmation request message, acquire the identity confirmation information of the owner of the partner terminal from the electronic certificate of the partner terminal and transmit response encrypted information, which is the result of calculating an encrypted text obtained by encrypting the identity confirmation information using the public key and the encrypted information through computation corresponding to the homomorphic encryption, as a response to the transmission source of the authentication station-issued confirmation request message; and
a result notification unit, including one or more processors, configured to decrypt the response encrypted information, determine whether or not the identity confirmation information of the owner of the terminal and the identity confirmation information of the owner of the partner terminal match each other based on whether or not the decryption result matches a predetermined value, and notify the terminal of the determination result.

3. The authentication station server according to claim 2, wherein the identity confirmation information includes one or more items,
the terminal-issued confirmation request message includes an item for confirming the sameness of the identity confirmation information, the item being selected from among the one or more items by the terminal,
the confirmation request unit is configured to calculate the encrypted information by encrypting the identity confirmation information for the item of the owner of the terminal using the public key, and transmit the item in a state of being included in the authentication station-issued confirmation request message, the confirmation response unit is configured to generate the encrypted text obtained by acquiring the identity confirmation information for the item of the owner of the partner terminal from the storage unit and encrypting the identity confirmation information using the public key, calculate the response encrypted information, and transmit the calculated response encrypted information as a response, and the result notification unit is configured to decrypt the response encrypted information and determines whether or not the identity confirmation information for the item of the owner of the terminal and the identity confirmation information for the item of the owner of the partner terminal match each other based on whether or not the decryption result matches the predetermined value.

4. The authentication station server according to claim 2, wherein E, which is the homomorphic encryption, is homomorphic encryption in which $E(M1) \times E(M2) = E(M1+M2)$ is satisfied for unencrypted texts M1 and M2, and the confirmation request unit is configured to transmit $E(V1)$ as the encrypted information for identity confirmation information V1 of the owner of the terminal, the confirmation response unit is configured to generate a random number r for identity confirmation information V2 of the owner of the partner terminal, and transmit $E(V1)r \times E(V2)-r$ as the response encrypted information as a response, and the result notification unit is configured to determine whether or not V1 and V2 match each other based on whether or not the decryption result of the response encrypted information is 0, which is the predetermined value.

5. The authentication station server according to claim 2, wherein E, which is the homomorphic encryption, is homomorphic encryption in which $E(M1) \times E(M2) = E(M1 \times M2)$ is satisfied for unencrypted texts M1 and M2, and the confirmation request unit is configured to transmit $E(V1)$ as the encrypted information for identity confirmation information V1 of the owner of the terminal, the confirmation response unit is configured to generate a random number r for identity confirmation information V2 of the owner of the partner terminal, and transmits $E(V1)r \times E(V2)-r$ as the response encrypted information as a response, and the result notification unit is configured to determine whether or not V1 and V2 match each other based on whether or not the decryption result of the response encrypted information is 1, which is the predetermined value.

6. The authentication station server according to claim 2, wherein a value of a key owner included in the electronic certificate issued to the terminal is identification information of the terminal that is unrelated to the identity confirmation information of the owner of the terminal.

7. The authentication station server according to claim 2, wherein the terminal-issued confirmation request message received from the terminal is signed using at least one of a secret key corresponding to the electronic certificate and a secret key corresponding to a model number electronic certificate indicating a model number of the terminal.

8. An owner sameness confirmation method to be executed by an authentication station server of an owner sameness confirmation system including a plurality of terminals and a plurality of authentication station servers, wherein the authentication station server includes
a storage unit configured to store an electronic certificate issued to the terminal and identity confirmation information of an owner of the terminal in association with each other, the method comprising:

a step of, upon receiving a terminal-issued confirmation request message including an electronic certificate of a partner terminal that is a target of owner sameness confirmation from the terminal, transmitting an authentication station-issued confirmation request message including encrypted information obtained by encrypting the identity confirmation information of the owner of the terminal using a public key for homomorphic encryption, the electronic certificate of the partner terminal, and the public key, to an authentication station server that issued the electronic certificate of the partner terminal;

a step of, upon receiving the authentication station-issued confirmation request message, acquiring the identity confirmation information of the owner of the partner terminal from the electronic certificate of the partner terminal and transmitting response encrypted information, which is the result of calculating an encrypted text obtained by encrypting the identity confirmation information using the public key and the encrypted information through computation corresponding to the homomorphic encryption, as a response to the transmission source of the authentication station-issued confirmation request message; and a step of decrypting the response encrypted information, determining whether or not the identity confirmation information of the owner of the terminal and the identity confirmation information of the owner of the partner terminal match each other based on whether or not the decryption result matches a predetermined value, and notifying the terminal of the determination result.

9. The owner sameness confirmation method according to claim 8, wherein the identity confirmation information is constituted by one or more items, the terminal-issued confirmation request message includes an item for confirming the sameness of the identity confirmation information, the item being selected from among the one or more items by the terminal, and the method further comprises:

calculating the encrypted information by encrypting the identity confirmation information for the item of the owner of the terminal using the public key, transmits the item in a state of being included in the authentication station-issued confirmation request message, generating the encrypted text obtained by acquiring the identity confirmation information for the item of the owner of the partner terminal from the storage unit and encrypting the identity confirmation information using the public key, calculates the response encrypted information, and transmits the calculated response encrypted information as a response, and decrypting the response encrypted information and determines whether or not the identity confirmation information for the item of the owner of the terminal and the identity confirmation information for the item of the owner of the partner terminal match each other based on whether or not the decryption result matches the predetermined value.

10. The owner sameness confirmation method according to claim 8,
wherein E, which is the homomorphic encryption, is homomorphic encryption in which $E(M1) \times E(M2) = E(M1+M2)$ is satisfied for unencrypted texts M1 and M2, and the method further comprises:
transmitting E(V1) as the encrypted information for identity confirmation information V1 of the owner of the terminal,
generating a random number r for identity confirmation information V2 of the owner of the partner terminal, and transmits $E(V1)r \times E(V2)-r$ as the response encrypted information as a response, and
determining whether or not V1 and V2 match each other based on whether or not the decryption result of the response encrypted information is 0, which is the predetermined value.

11. The owner sameness confirmation method according to claim 8,
wherein E, which is the homomorphic encryption, is homomorphic encryption in which $E(M1) \times E(M2) = E(M1 \times M2)$ is satisfied for unencrypted texts M1 and M2, and the method further comprises:
transmitting E(V1) as the encrypted information for identity confirmation information V1 of the owner of the terminal, and the method further comprises:
generating a random number r for identity confirmation information V2 of the owner of the partner terminal, and transmits $E(V1)r \times E(V2)-r$ as the response encrypted information as a response, and
determining whether or not V1 and V2 match each other based on whether or not the decryption result of the response encrypted information is 1, which is the predetermined value.

12. The owner sameness confirmation method according to claim 8,
wherein a value of a key owner included in the electronic certificate issued to the terminal is identification information of the terminal that is unrelated to the identity confirmation information of the owner of the terminal.

13. The owner sameness confirmation method according to claim 8,
wherein the terminal-issued confirmation request message received from the terminal is signed using at least one of a secret key corresponding to the electronic certificate and a secret key corresponding to a model number electronic certificate indicating a model number of the terminal.

* * * * *